US012703306B2

(12) United States Patent
Han

(10) Patent No.: US 12,703,306 B2
(45) Date of Patent: Aug. 11, 2026

(54) FRUNK FOR VEHICLES

(71) Applicants: HYUNDAI MOTOR COMPANY, Seoul (KR); KIA CORPORATION, Seoul (KR)

(72) Inventor: Ju Wan Han, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 368 days.

(21) Appl. No.: 18/495,226

(22) Filed: Oct. 26, 2023

(65) Prior Publication Data

US 2024/0391389 A1 Nov. 28, 2024

(30) Foreign Application Priority Data

May 23, 2023 (KR) ........................ 10-2023-0066541

(51) Int. Cl.
*B60R 5/02* (2006.01)
*B60R 11/00* (2006.01)

(52) U.S. Cl.
CPC ......... *B60R 5/02* (2013.01); *B60R 2011/0038* (2013.01)

(58) Field of Classification Search
CPC ............... B60R 5/02; B60R 2011/0038; B60R 2021/343
See application file for complete search history.

(56) References Cited

U.S. PATENT DOCUMENTS 10,800,458 B2 * 10/2020 Makowski ............... B60J 10/86
11,628,888 B2 * 4/2023 Cote ......................... B60R 5/02 180/69.2
11,827,180 B2 * 11/2023 Weber .................. B62D 25/087
12,441,169 B1 * 10/2025 Hammer .................. B60J 10/86
2025/0145225 A1 * 5/2025 Torres Sainz .......... B62D 25/12

FOREIGN PATENT DOCUMENTS

KR 20220053287 A * 4/2022 ............... B60R 5/02
KR 10-2022-0055654 5/2022

* cited by examiner

*Primary Examiner* — Aaron L Lembo
(74) *Attorney, Agent, or Firm* — Fish & Richardson P.C.

(57) ABSTRACT

A frunk for a vehicle includes a lower part, which is formed in a container shape having a loading space defined therein, and an upper part, which has an opening formed therein so as to be covered by a hood, is assembled to the upper end of the lower part, and is pressed by the hood and separated from the lower part when load equal to or greater than a predetermined value is applied onto the hood.

14 Claims, 14 Drawing Sheets

FRUNK FOR VEHICLES

CROSS-REFERENCE TO RELATED APPLICATION

This application claims the priority benefit of Korean Patent Application No. 10-2023-0066541, filed on May 23, 2023, in the Korean Intellectual Property Office, the disclosure of which is incorporated herein by reference.

TECHNICAL FIELD

The present disclosure relates to a frunk for vehicles capable of improving performance of absorbing impact applied to a pedestrian when the pedestrian collides with a hood of a vehicle, increasing the loading capacity thereof, improving the opening/closing performance of the hood, and preventing introduction of foreign substances thereinto.

BACKGROUND

An internal combustion engine vehicle may include, at a front portion thereof, an engine compartment receiving an engine and a hood covering the engine compartment, and the vehicle may include, at a rear portion, a trunk or a tailgate.

In some cases, where an electric vehicle has no engine, a space present in a front portion thereof (i.e. a space typically occupied by an engine in an internal combustion engine vehicle) may be utilized as a loading space (conventionally referred to as a "frunk") together with a rear trunk.

In some cases, a frunk cover may be provided to cover an opening of a frunk, thereby opening and closing a loading space of the frunk.

The frunk cover may occupy part of the loading space of the frunk, which may lead to reduction in the size of the loading space. In addition, for a user to first open the hood and then to open the frunk cover, the user may experience inconvenience in using the frunk.

In some cases, the frunk cover may be eliminated such that the hood directly covers the opening of the frunk in place of the frunk cover.

This structure may include a sealing structure between the hood and the opening of the frunk. In some cases, when a pedestrian collides with the hood and the head of the pedestrian strikes the sealing structure, impact applied to the head of the pedestrian may not be properly absorbed, which increases the risk of injury to the pedestrian.

In some cases, it may be possible to secure an impact-absorbing space by increasing the size of a space between an outer panel and an inner panel of the hood. However, when the impact-absorbing space is secured in this way, there is a limitation on the extent to which the loading capacity of the frunk is increased.

Furthermore, since the loading space of the frunk is sealed by the sealing structure between the hood and the opening of the frunk, it may not be easy for a user to open and close the hood due to difference in atmospheric pressure between the inside and outside of the loading space of the frunk.

In some cases, a hole may be defined in the frunk. In this case, however, because the hole is always open, there is a problem in that foreign substances may enter the frunk.

SUMMARY

The present disclosure describes a frunk for vehicles capable of separating a part supporting a hood and a part defining a loading space from each other in order to effectively absorb impact applied to a pedestrian when the pedestrian strikes the hood and capable of increasing the size of the loading space thereof.

The present disclosure further describes a frunk for vehicles capable of eliminating difference in atmospheric pressure between the inside and outside of the loading space when opening the hood, thereby improving the opening/closing performance of the hood, and capable of preventing introduction of foreign substances thereinto.

In accordance with the present disclosure, a frunk includes a lower part, which has a loading space defined therein, and an upper part, which has an opening formed therein so as to be covered by a hood, is assembled to the upper end of the lower part, and is pressed by the hood and separated from the lower part when load equal to or greater than a predetermined value is applied onto the upper part.

The lower part may include a lower hook portion formed on an outer surface thereof so as to be open in a downward direction, and the upper part may include an upper hook portion formed on an inner surface thereof so as to be open in an upward direction. The lower hook portion may catch in the upper hook portion from above to below so that the upper hook portion is separated from the lower hook portion in the downward direction when pressed by the hood.

The frunk may further include a sealing member assembled to the upper part so as to protrude in the upward direction to be in tight contact with the lower surface of the hood.

The frunk may further include a locking module configured to lock or unlock the lower part and the upper part to or from each other depending on the position of the hood covering the frunk.

The locking module may include a guider configured to support the hood so as to be moved according to changes in position of the hood, a slider including a locking protrusion formed in a shape corresponding to the shape of a locking through-hole formed in a side surface of the lower part, the slider being supported by the guider so as to be moved according to changes in position of the guider so that the locking protrusion is locked to or unlocked from the locking through-hole, and a housing coupled to the upper part so as to guide movement of the guider and the slider.

The guider may include a concave-convex cam portion formed in an upward-downward longitudinal direction thereof, and the slider may include a driven portion formed so as to face the cam portion. The slider may be moved forward and backward by sliding movement of the driven portion along the surface of the cam portion.

The upper end of the guider may support the lower surface of the hood. The slider may include a through-hole formed therein in the upward-downward direction to allow the guider to be inserted thereinto, and the driven portion may be formed on the inner surface of the through-hole that faces the lower part.

The cam portion may include a locking area causing the locking protrusion to move forward to be locked to the locking through-hole when the driven portion is located in the locking area and an unlocking area causing the locking protrusion to move backward to be unlocked from the locking through-hole when the driven portion is located in the unlocking area.

The locking area may include first and second locking areas, and the unlocking area may include first and second unlocking areas. The first locking area may be formed in a concave shape on the surface of the cam portion along which the driven portion slides. The first unlocking area may be formed in a convex shape on the surface of the cam portion so as to extend downward from the first locking area. The second locking area may be formed in a concave shape on the surface of the cam portion so as to extend downward from the first unlocking area. The second unlocking area may be formed on the surface of the cam portion so as to extend upward from the first locking area.

When the hood is closed, the driven portion may be located in the first locking area. When the hood is popped up, the driven portion may be located in the first unlocking area. When the hood is fully opened from a popped-up state, the driven portion may be located in the second locking area. When load equal to or greater than a predetermined value is applied onto the hood, the driven portion may be located in the second unlocking area.

When load equal to or greater than a predetermined value is applied onto the hood, the locking module may enter an unlocking mode so that the upper part and the lower part are separated from each other.

The locking module may further include a guider spring configured to provide elastic restoring force to the guider in the upward direction.

The housing may receive the guider inserted thereinto and may guide upward/downward movement of the guider, and the guider spring may be supported between the guider and the housing.

The locking module may further include a slider spring configured to provide elastic restoring force to the slider in the forward direction.

The housing may receive the slider inserted thereinto and may guide forward/backward movement of the slider, and the slider spring may be supported between the slider and the housing.

DETAILED DESCRIPTION

Figure 1:
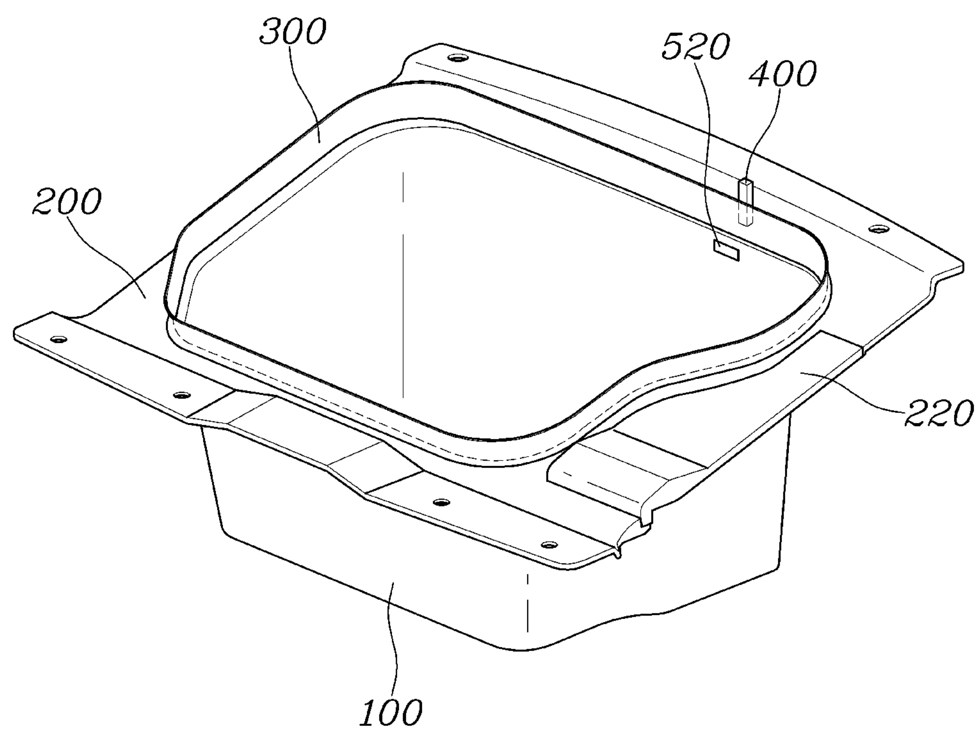
FIG. 1 is a perspective view showing an example of a frunk.

Hereinafter, the one or more implementations disclosed in the present specification will be described in detail with reference to the accompanying drawings, and the same or similar elements are denoted by the same reference numerals even though they are depicted in different drawings, and redundant descriptions thereof will be omitted.

In some implementations, a frunk for vehicles can include a lower part 100, which is formed in a container shape to have a loading space 100*a* defined therein, and an upper part 200, which has an opening 200*a* formed therein so as to be covered by a hood 700, is assembled to the upper end of the lower part 100, and is pressed by the hood 700 and separated from the lower part 100 when load equal to or greater than a predetermined value is applied onto the upper part 200.

Figure 2:
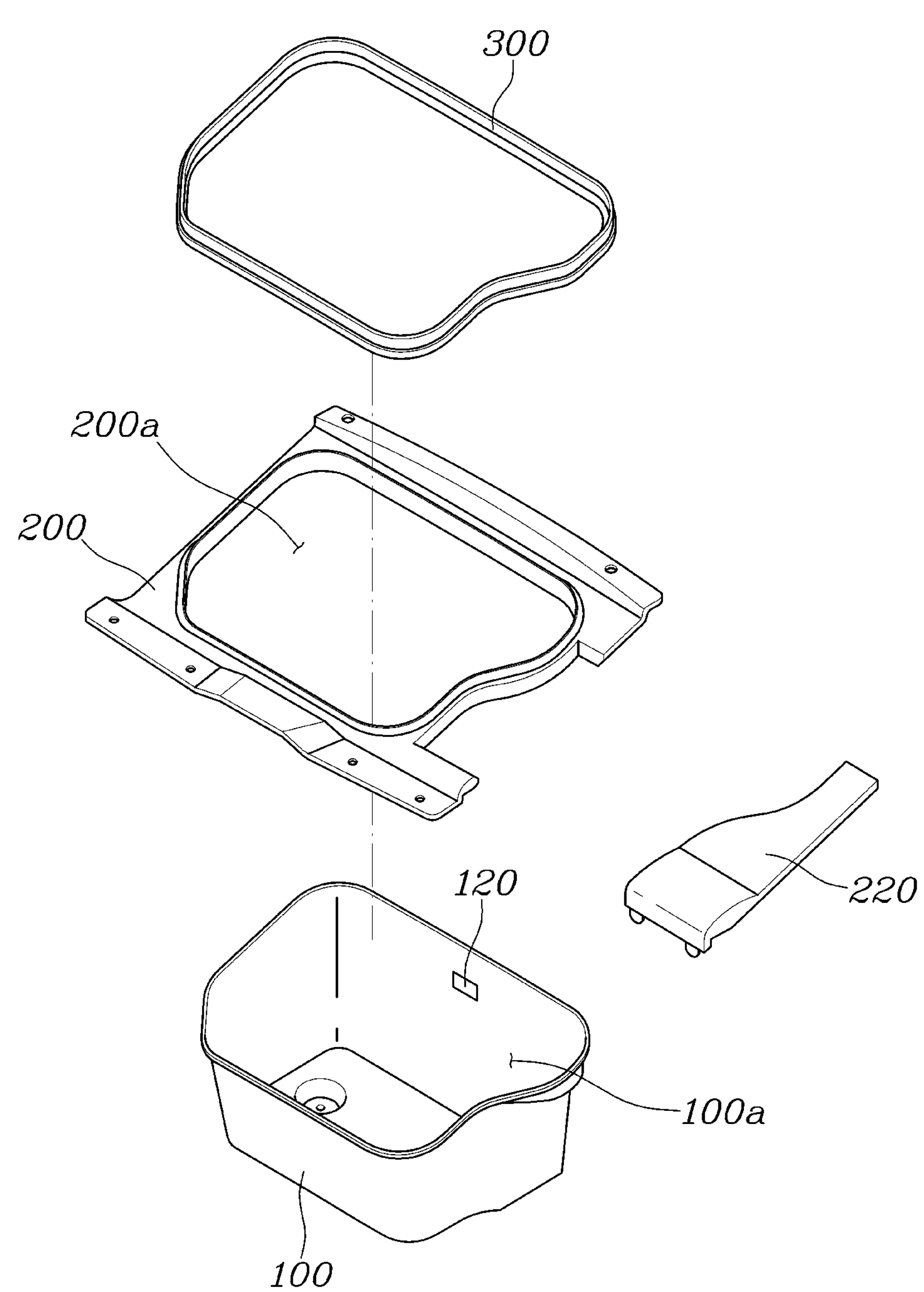
FIG. 2 is an exploded perspective view of the frunk.

For example, referring to FIGS. 1 and 2, the lower part 100 is formed in the shape of a rectangular box having an open top, and the loading space 100*a* is defined in the lower part 100.

In addition, the upper part 200 formed in the shape of a rectangular plate is coupled to part of the vehicle body that is located inside the hood 700. The opening 200*a* is formed in the center of the upper part 200 so as to have a shape corresponding to the shape of the upper end of the lower part 100, and the periphery of the opening 200*a* is assembled to the upper end of the lower part 100. A battery garnish 220 may be coupled to a side surface of the upper part 200.

The hood 700 supports the opening 200*a* in the upper part 200 so as to cover the opening 200*a*. That is, the hood 700 serves as a cover of the frunk.

The upper part 200 is assembled to the lower part 100 so as to be separable from the lower part 100 in a downward direction.

Accordingly, when the front side of the vehicle collides with a pedestrian and the head of the pedestrian strikes the hood 700, impact load caused by the head of the pedestrian is transferred to the upper part 200.

Subsequently, the upper part 200 is separated from the lower part 100 in the downward direction by the impact load. The upper part 200 absorbs the impact load caused by the pedestrian through such separation. In this way, performance of absorbing impact applied to the head of the pedestrian is improved, and consequently, the risk of injury to the pedestrian is reduced.

In the conventional art, impact load caused by a pedestrian is absorbed in the space between an outer panel and an inner panel of a hood. Therefore, in order to effectively reduce impact load caused by the pedestrian, the size of the space between the outer panel and the inner panel may be increased.

This conventional structure may cause increase in the thickness of the hood 700, and include a space enabling increase in the thickness of the hood 700. Therefore, there is a limitation on the extent to which the size of the loading space 100*a* of the frunk is increased.

In some implementations of the present application, impact load caused by the pedestrian is absorbed in the space generated by movement of the upper part 200 of the frunk in the downward direction. Therefore, the size of the space between the outer panel 720 and the inner panel 710 of the hood 700 is reduced compared to in the conventional art.

Therefore, the thickness of the hood 700 is reduced, and space obtained by reduction in the thickness of the hood 700 is utilized as part of the loading space 100*a* of the frunk. Accordingly, the size of the loading space 100*a* of the frunk is increased.

The lower part 100 and the upper part 200 may be assembled to each other in a hook-coupling manner.

Figure 3:
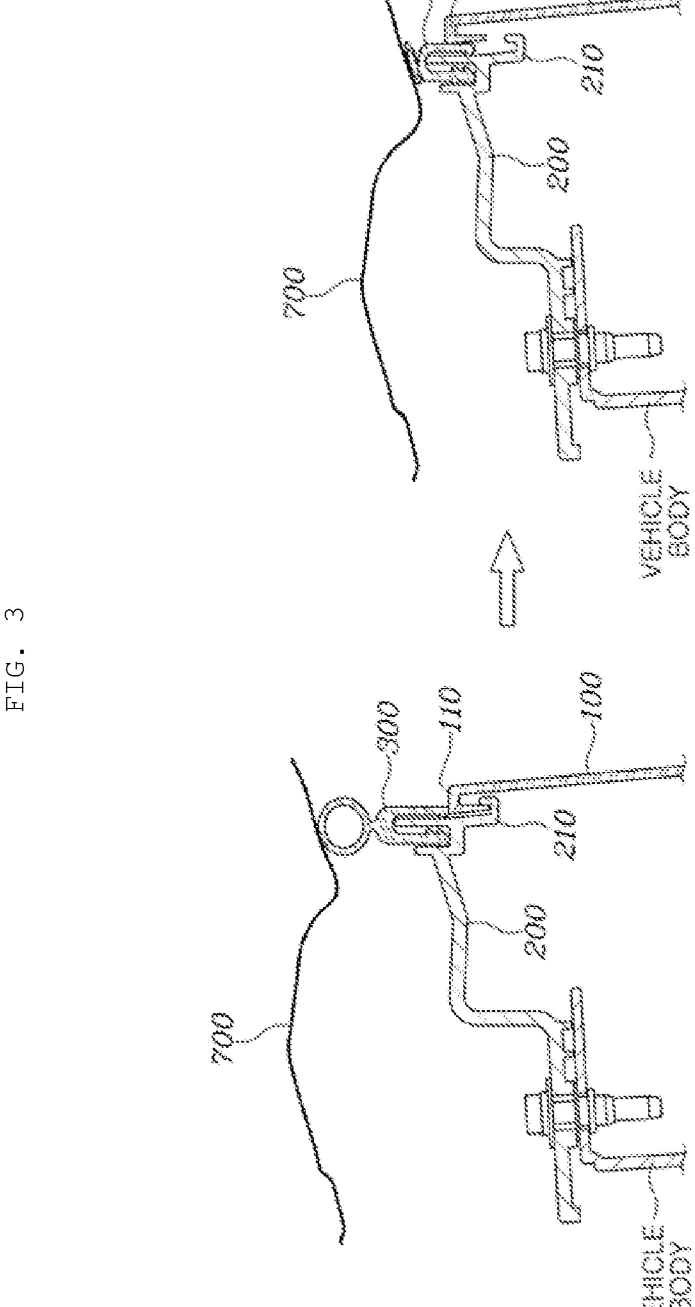
FIG. 3 is a view showing an example a structure in which an upper part and a lower part of the frunk are separated from each other when impact is applied to a hood.

Referring to FIG. 3, the lower part 100 includes a lower hook portion 110 formed on the outer surface thereof so as to be open in the downward direction, and the upper part 200 includes an upper hook portion 210 formed on the inner surface thereof so as to be open in the upward direction. The lower hook portion 110 catches in the upper hook portion 210 from above to below. Accordingly, when pressed by the hood 700, the upper hook portion 210 is separated from the lower hook portion 110 in the downward direction.

In detail, the lower hook portion 110 is formed in the shape of a hook bent in the downward direction from the edge of the outer surface of the upper end of the lower part 100, and the upper hook portion 210 is formed in the shape of a hook bent in the upward direction from the edge of the inner surface of the opening 200*a* in the upper part 200.

Accordingly, the lower part 100 and the upper part 200 are assembled to each other in a manner of placing the lower part 100 above the upper part 200 and then moving the lower part 100 downward toward the upper part 200 such that the lower hook portion 110 catches in the upper hook portion 210 from above to below.

Therefore, when pressed downward by the hood 700, the upper part 200 is separated from the lower part 100 in the downward direction, thereby absorbing impact load.

Further, since the structure for assembling and disassembling the lower part 100 to and from the upper part 200 is simple, it is possible to improve efficiency of use of the frunk and to facilitate maintenance and repair of the frunk.

In addition, the frunk further includes a sealing member 300 assembled to the upper part 200 so as to protrude in the upward direction. The sealing member 300 is in tight contact with the lower surface of the hood 700.

For example, the sealing member 300 may be a weather strip formed in a ring shape. The lower end of the sealing member 300 is assembled to the upper end of the upper part 200, and the upper end of the sealing member 300 is in tight contact with the lower surface of the hood 700.

Therefore, when the hood 700 is closed, the sealing member 300 comes into tight contact with the lower surface of the hood 700 and thus seals the loading space 100*a* of the frunk, thereby preventing foreign substances from entering the loading space 100*a*.

In addition, the frunk includes a locking module configured to lock or unlock the lower part 100 and the upper part 200 to or from each other depending on the position of the hood 700 covering the frunk.

Figure 4:
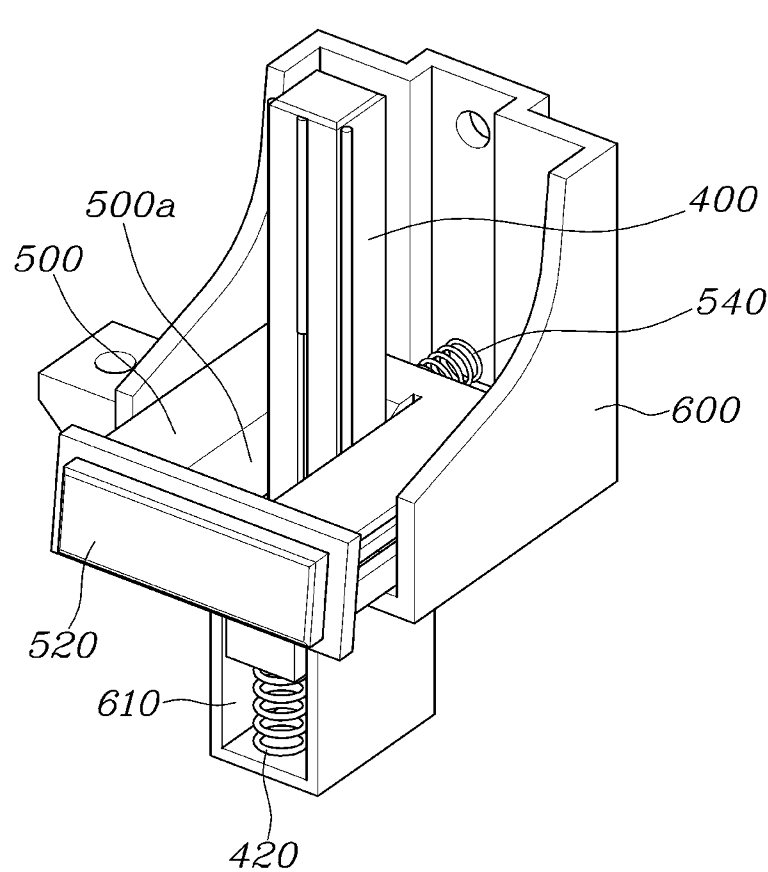
FIG. 4 is a perspective view showing an example of a locking module.
Figure 5:
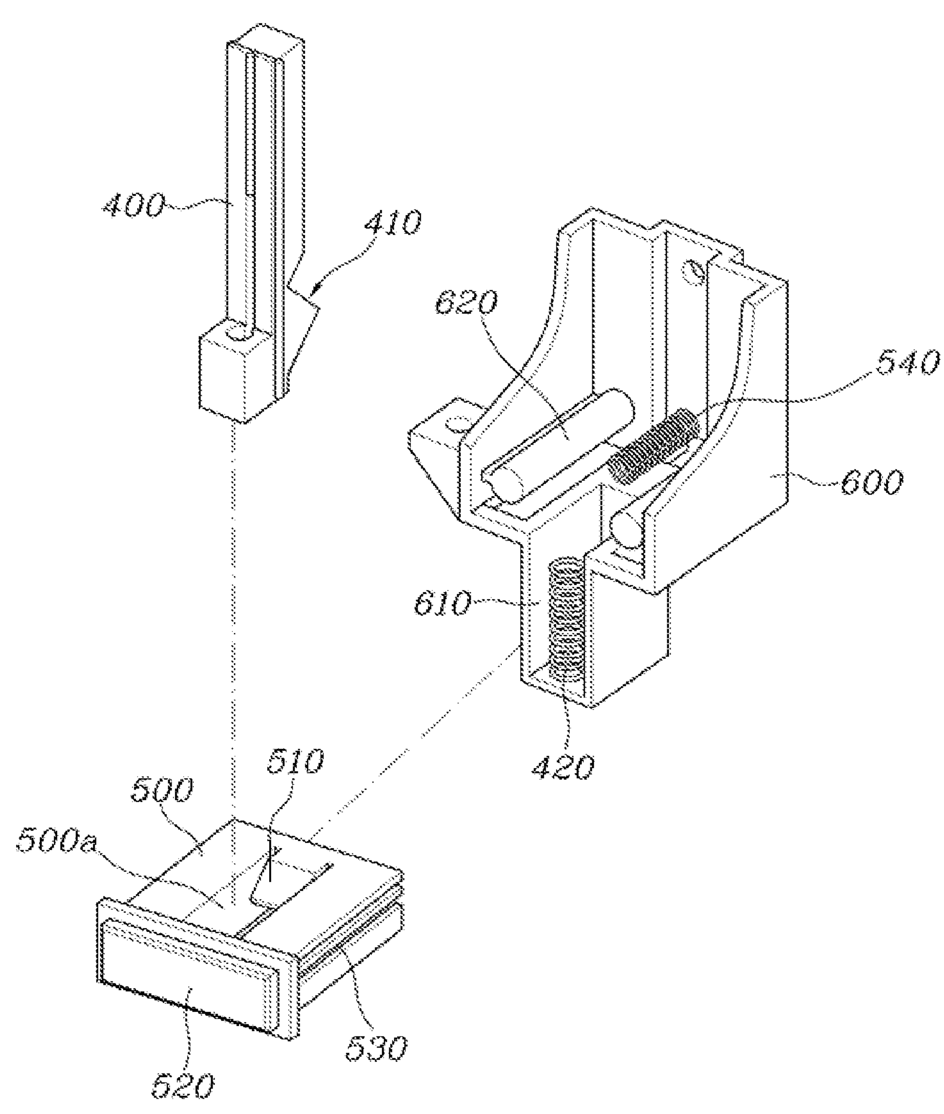
FIG. 5 is an exploded perspective view of the locking module.

Referring to FIGS. 4 and 5, the locking module includes a guider 400, which supports the hood 700 so as to be moved according to changes in position of the hood 700, a slider 500, which includes a locking protrusion 520 formed in a shape corresponding to the shape of a locking through-hole 120 formed in a side surface of the lower part 100 and is supported by the guider 400 so as to be moved according to changes in position of the guider 400 so that the locking protrusion 520 is locked to or unlocked from the locking through-hole 120, and a housing 600, which is coupled to the upper part 200 so as to guide movement of the guider 400 and the slider 500.

Since the hood 700 is supported by the guider 400, the guider 400 is linearly moved upward or downward by opening/closing movement of the hood 700 or pressing-down movement of the hood 700 toward the frunk.

In addition, since the slider 500 is supported by the guider 400, the slider 500 is linearly moved forward or backward by upward or downward movement of the guider 400.

The locking protrusion 520 formed on the slider 500 is located at a position facing the locking through-hole 120 formed in a side surface of the lower part 100.

Therefore, when the slider 500 moves forward, the locking protrusion 520 formed on the slider 500 is fitted into the locking through-hole 120 so as to be locked to the locking through-hole 120, whereby the lower part 100 and the upper part 200 are firmly coupled to each other.

In some examples, when the slider 500 moves backward, the locking protrusion 520 escapes from the locking through-hole 120 so as to be unlocked from the locking through-hole 120, whereby the locking through-hole 120 functions as a ventilation hole, through which difference in atmospheric pressure between the inside and outside of the frunk is eliminated. As a result, the opening/closing performance of the hood 700 is improved.

In detail, in the present disclosure, the slider 500 may be supported by a cam portion 410 formed on the guider 400 so as to be moved forward and backward.

To this end, in the present disclosure, as shown in FIGS. 10 to 13, the guider 400 may include a concave-convex cam portion 410 formed in an upward-downward longitudinal direction thereof, and the slider 500 may include a driven portion 510 formed so as to face the cam portion 410. The slider 500 may be moved forward and backward by sliding movement of the driven portion 510 along the surface of the cam portion 410.

The upper end of the guider 400 may support the lower surface of the hood 700, the slider 500 may include a through-hole 500*a* formed therein in the upward-downward direction to allow the guider 400 to be inserted thereinto, and the driven portion 510 may be formed on the inner surface of the through-hole 500*a* that faces the lower part 100.

In detail, the guider 400 is formed in a rectangular bar shape, and the upper end of the guider 400 penetrates the upper part 200 to support the lower surface of the hood 700.

The cam portion 410 is formed on the rear surface of the guider 400, and includes concave portions and convex portions formed continuously.

The through-hole 500*a* is formed in the center of the slider 500, and has a rectangular shape elongated in the forward-backward direction. The guider 400 is inserted into a front portion of the through-hole 500*a* so as to be movable upward and downward.

The driven portion 510 is formed on the inner surface of the rear portion of the through-hole 500*a* so as to protrude forward in a triangular shape. Accordingly, the front end of the driven portion 510 is supported in a direction perpendicular to the surface of the cam portion 410.

When the guider 400 moves upward and downward, the driven portion 510 supported by the surface of the cam portion 410 is moved forward by the concave portion of the cam portion 410 and is moved backward by the convex portion of the cam portion 410.

In this way, the slider 500 is moved forward or backward along the profile of the cam portion 410, whereby the locking protrusion 520 formed on the slider 500 is inserted into or escapes from the locking through-hole 120.

The cam portion 410 includes a locking area 411 in which the locking protrusion 520 is moved forward to be locked to the locking through-hole 120 when the driven portion 510 is located therein and an unlocking area 412 in which the locking protrusion 520 is moved backward to be unlocked from the locking through-hole 120 when the driven portion 510 is located therein.

That is, when the driven portion 510 is located in the locking area 411 of the cam portion 410, the locking protrusion 520 is moved forward and is inserted into the locking through-hole 120, and when the driven portion 510 is located in the unlocking area 412 of the cam portion 410, the locking protrusion 520 is moved backward and escapes from the locking through-hole 120.

In detail, the locking area 411 includes first and second locking areas 411*a* and 411*b*, and the unlocking area 412 includes first and second unlocking areas 412*a* and 412*b*. The first locking area 411*a* may be formed in a concave shape on the surface of the cam portion 410 along which the driven portion 510 slides, the first unlocking area 412*a* may be formed in a convex shape on the surface of the cam portion 410 so as to extend downward from the first locking area 411*a*, the second locking area 411*b* may be formed in a concave shape on the surface of the cam portion 410 so as to extend downward from the first unlocking area 412*a*, and the second unlocking area 412*b* may be formed on the surface of the cam portion 410 so as to extend upward from the first locking area 411*a*.

For example, the first locking area 411*a* is formed so as to be recessed in a V-shape toward the locking through-hole 120, and the first unlocking area 412*a* is formed so as to extend from the lower end of the first locking area 411*a* and to protrude in a V-shape in a direction away from the locking through-hole 120.

The second locking area 411*b* is formed so as to extend at an incline from the lower end of the first unlocking area 412*a* toward the locking through-hole 120, and the second unlocking area 412*b* is formed so as to extend from the upper end of the first locking area 411*a* in the upward-downward longitudinal direction.

That is, with respect to an imaginary reference plane between the front surface and the rear surface of the guider 400, the first locking area 411*a* and the second locking area 411*b* are formed closer to the locking through-hole 120, and the first unlocking area 412*a* and the second unlocking area 412*b* are formed farther from the locking through-hole 120, whereby the slider 500 is moved forward or backward according to changes in position of the driven portion 510.

In the present disclosure, when the hood 700 is closed, the driven portion 510 is located in the first locking area 411*a*. When the hood 700 is popped up, the driven portion 510 is located in the first unlocking area 412*a*. When the hood 700 is fully opened from the popped-up state, the driven portion 510 is located in the second locking area 411*b*. When load equal to or greater than a predetermined value is applied onto the hood 700, the driven portion 510 is located in the second unlocking area 412*b*.

Figure 6:
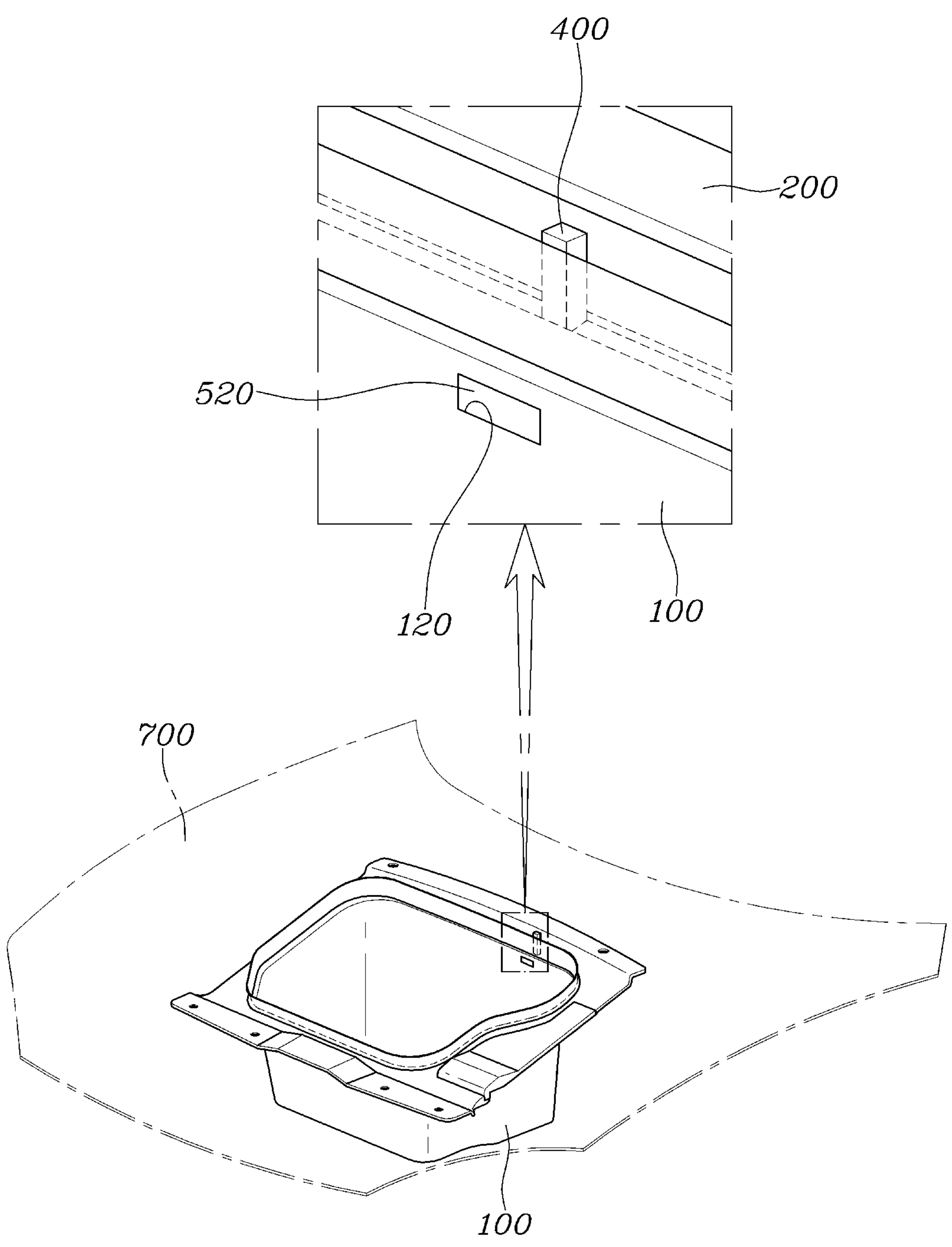
FIG. 6 is an enlarged view showing an example state in which a locking protrusion is locked to a locking through-hole when the hood is closed.
Figure 10:
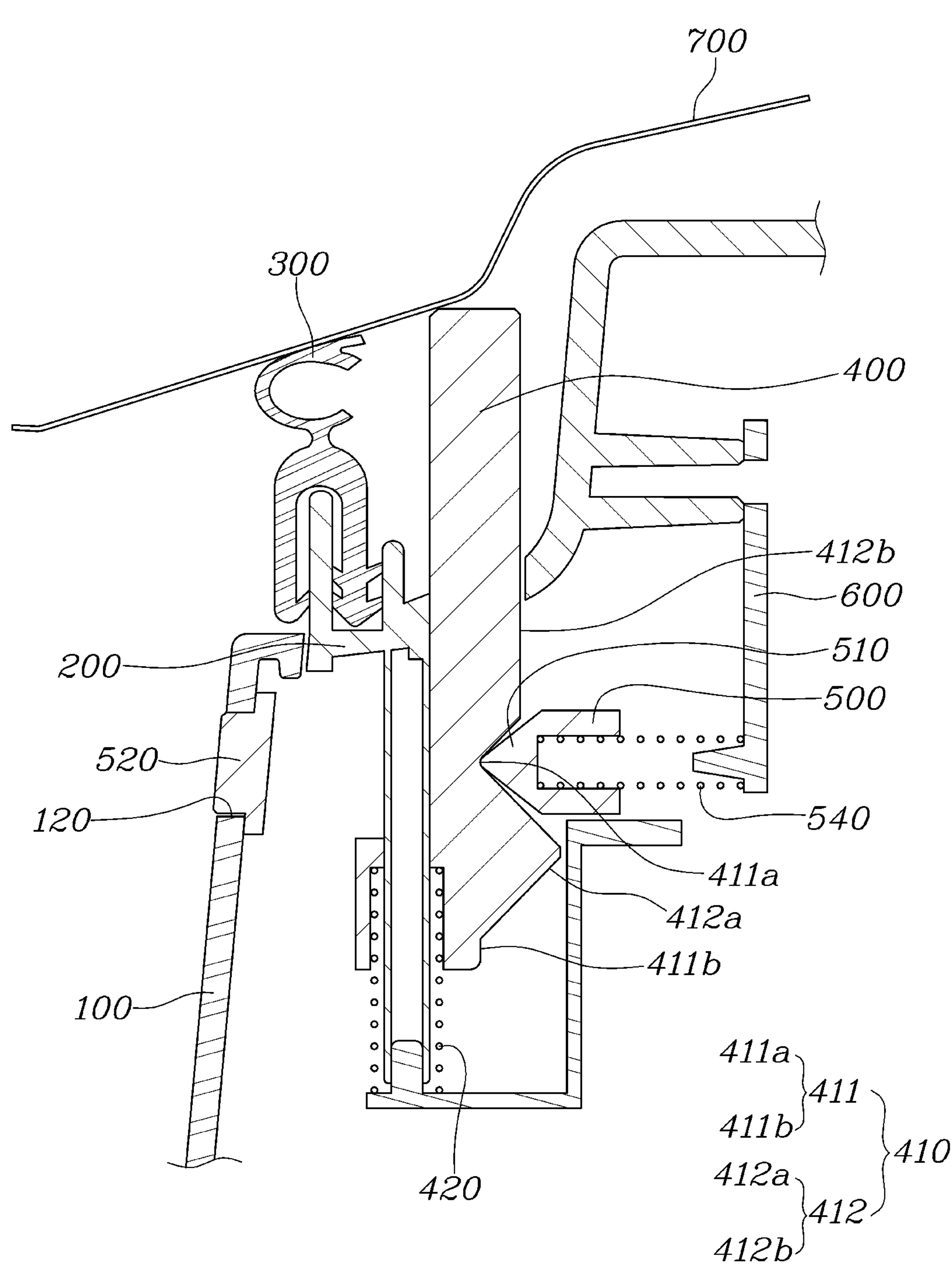
FIGS. 10 to 13 are cross-sectional views of the locking module shown in FIGS. 6 to 9.

That is, when the hood 700 is closed, as shown in FIGS. 6 and 10, the slider 500 is moved forward, and the driven portion 510 is located in the first locking area 411*a*, whereby the locking protrusion 520 is inserted into and locked to the locking through-hole 120.

Accordingly, the lower part 100 and the upper part 200 are firmly coupled to each other.

Figure 7:
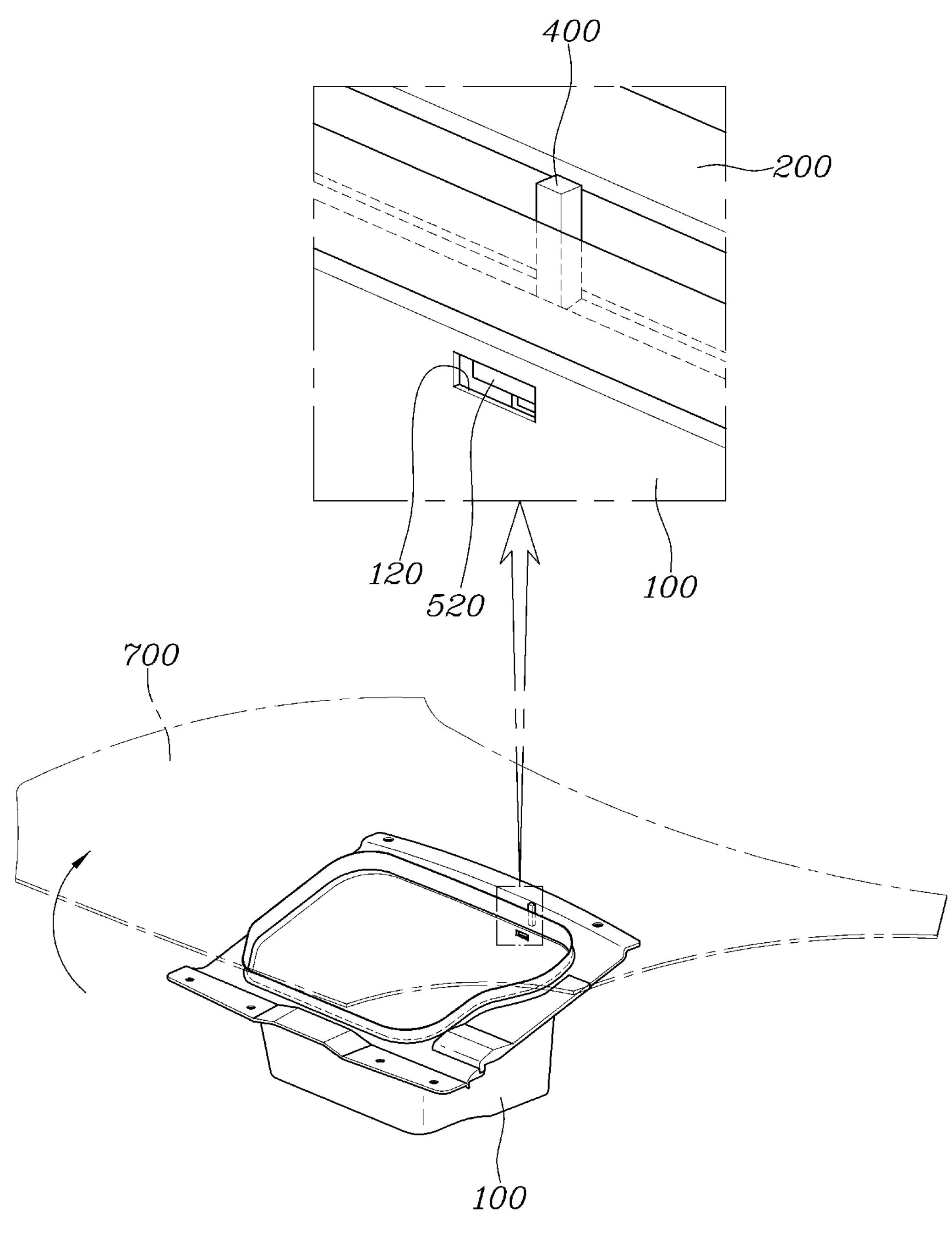
FIG. 7 is an enlarged view showing an example state in which the locking protrusion is unlocked from the locking through-hole when the hood is popped up.
Figure 11:
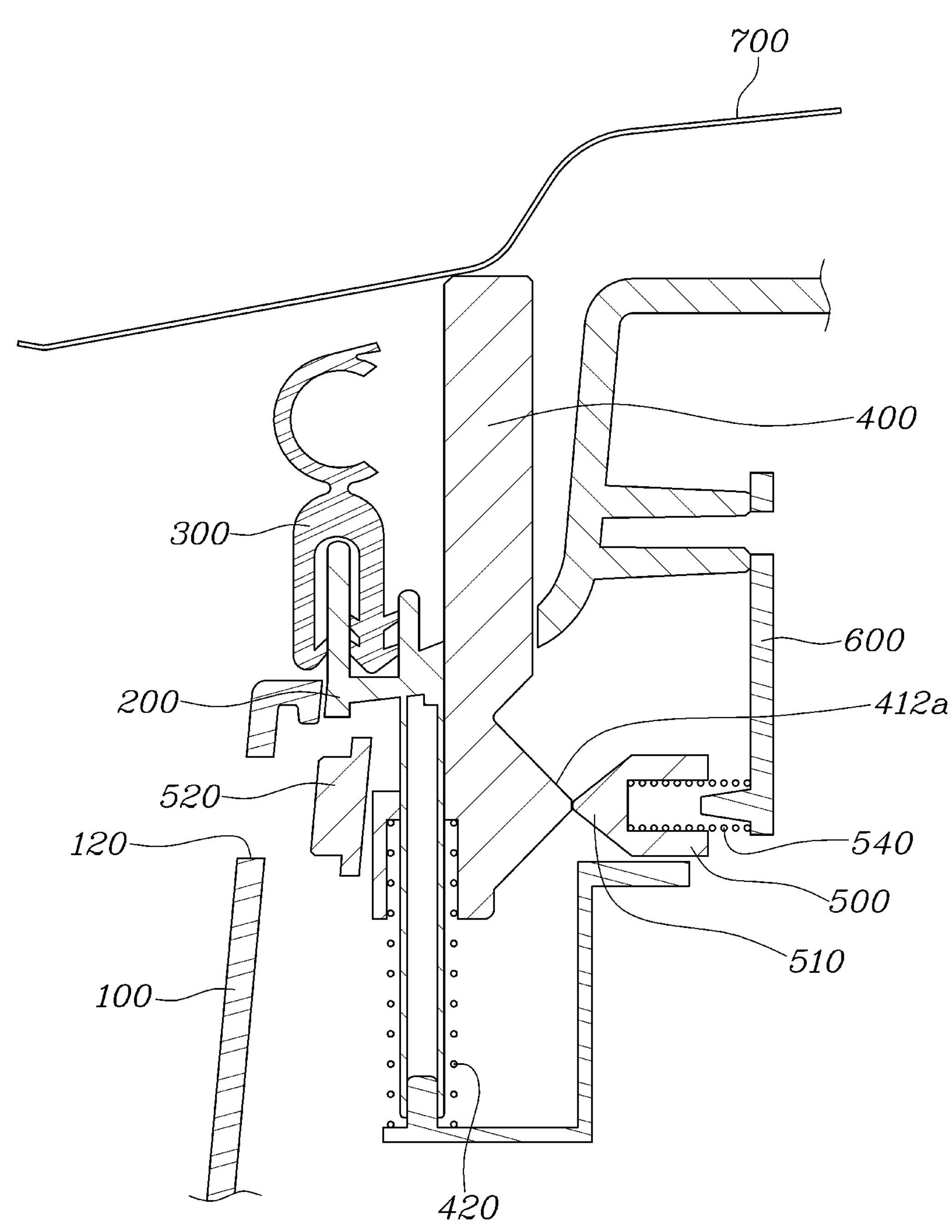

When the hood 700 is popped up from the closed state, as shown in FIGS. 7 and 11, the slider 500 is moved backward, and the driven portion 510 is located in the first unlocking area 412*a*, whereby the locking protrusion 520 escapes and is unlocked from the locking through-hole 120.

In this case, the locking through-hole 120 functions as a ventilation hole, through which difference in atmospheric pressure between the inside and outside of the frunk is eliminated. As a result, the opening/closing performance of the hood 700 is improved.

Figure 8:
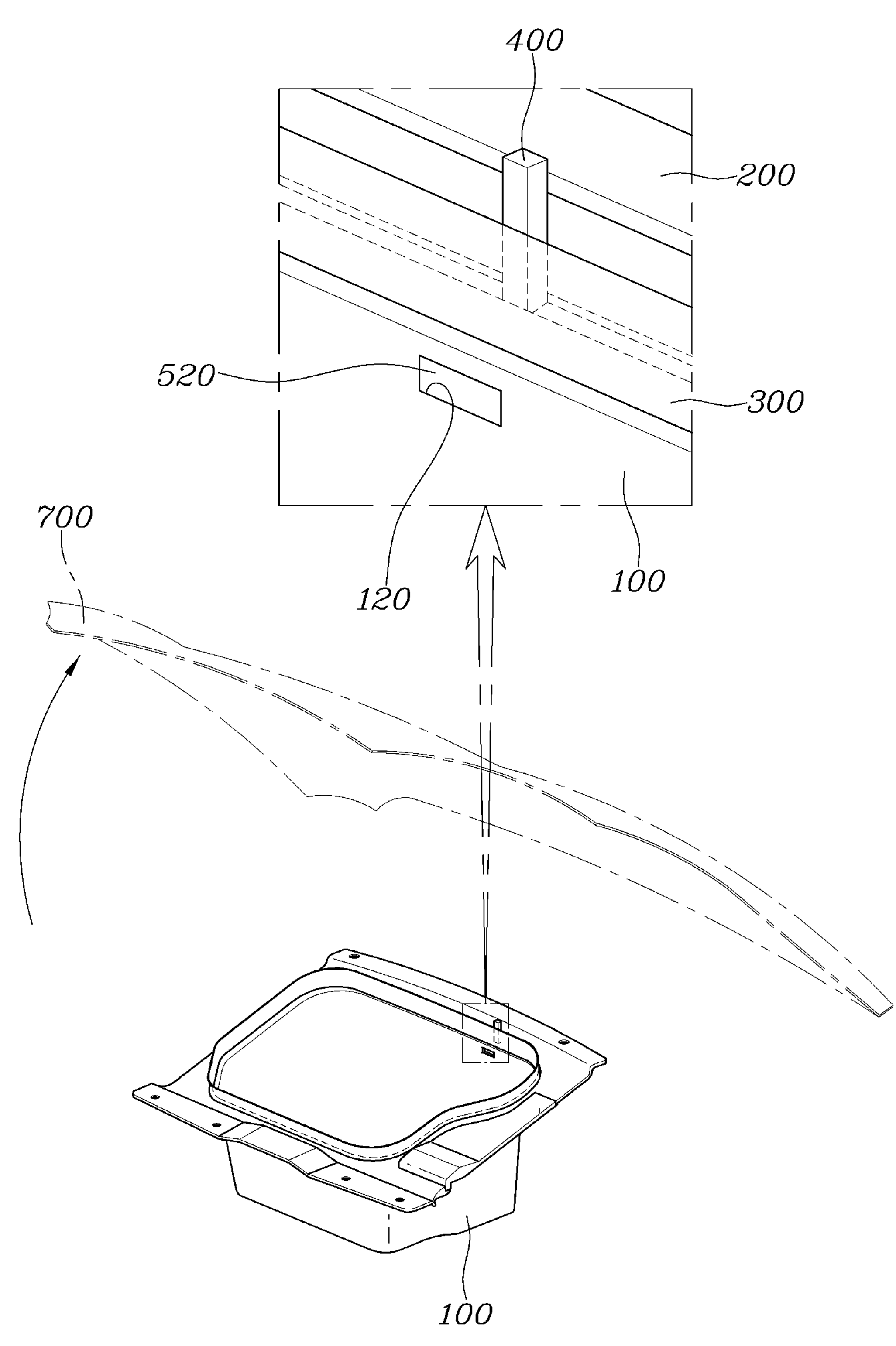
FIG. 8 is an enlarged view showing an example state in which the locking protrusion is locked to the locking through-hole when the hood is fully opened from the popped-up state.
Figure 12:
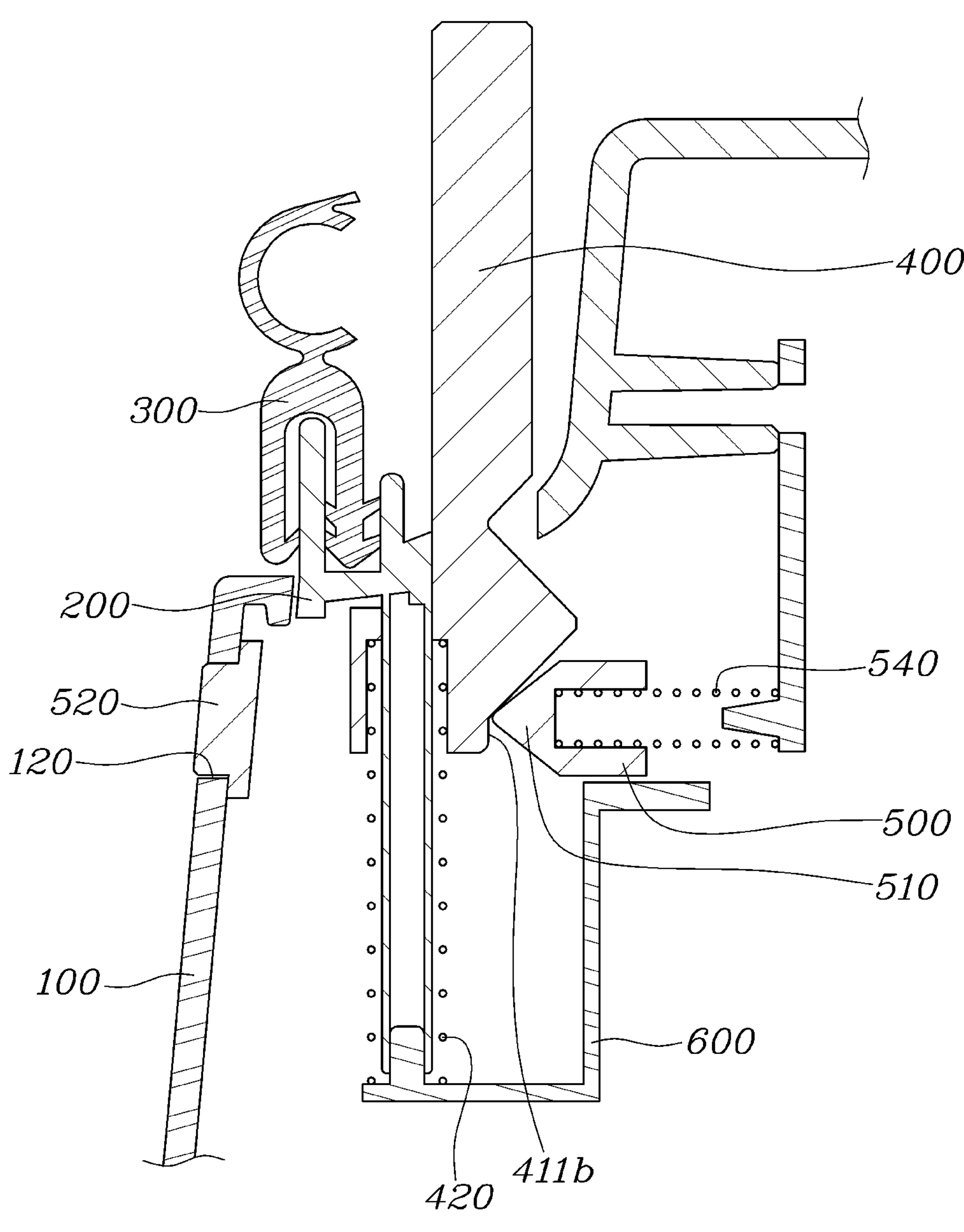

When the hood 700 is further opened from the popped-up state, as shown in FIGS. 8 and 12, the slider 500 is moved forward, and the driven portion 510 is located in the second locking area 411*b*, whereby the locking protrusion 520 is inserted into and locked to the locking through-hole 120.

Accordingly, the lower part 100 and the upper part 200 are firmly coupled to each other.

Furthermore, when load equal to or greater than a predetermined value is applied onto the hood 700, the locking module enters the unlocking mode, whereby the upper part 200 and the lower part 100 are separated from each other.

Figure 9:
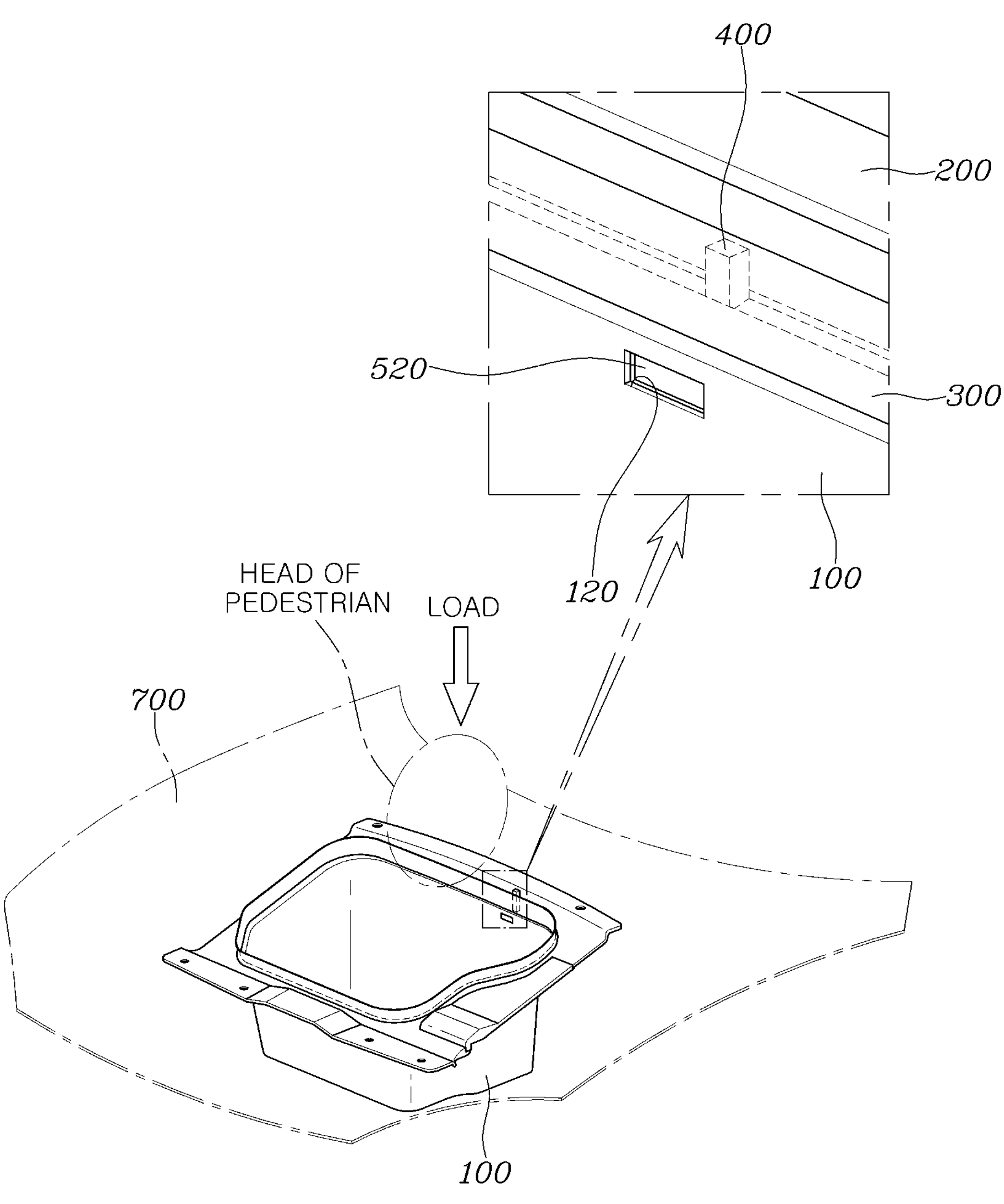
FIG. 9 is an enlarged view showing an example state in which the locking protrusion is unlocked from the locking through-hole when load is applied onto the hood.
Figure 13:
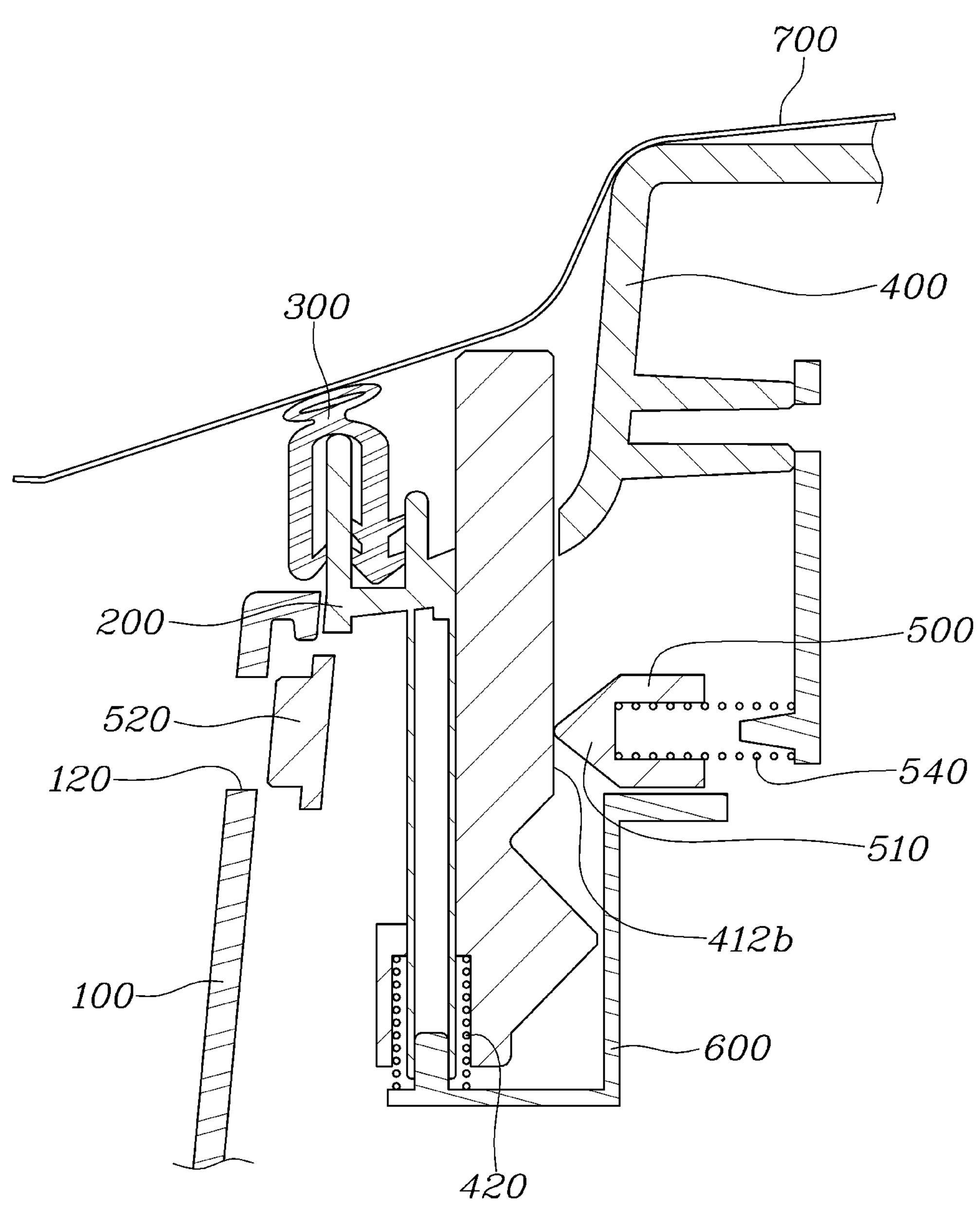
Figure 14:
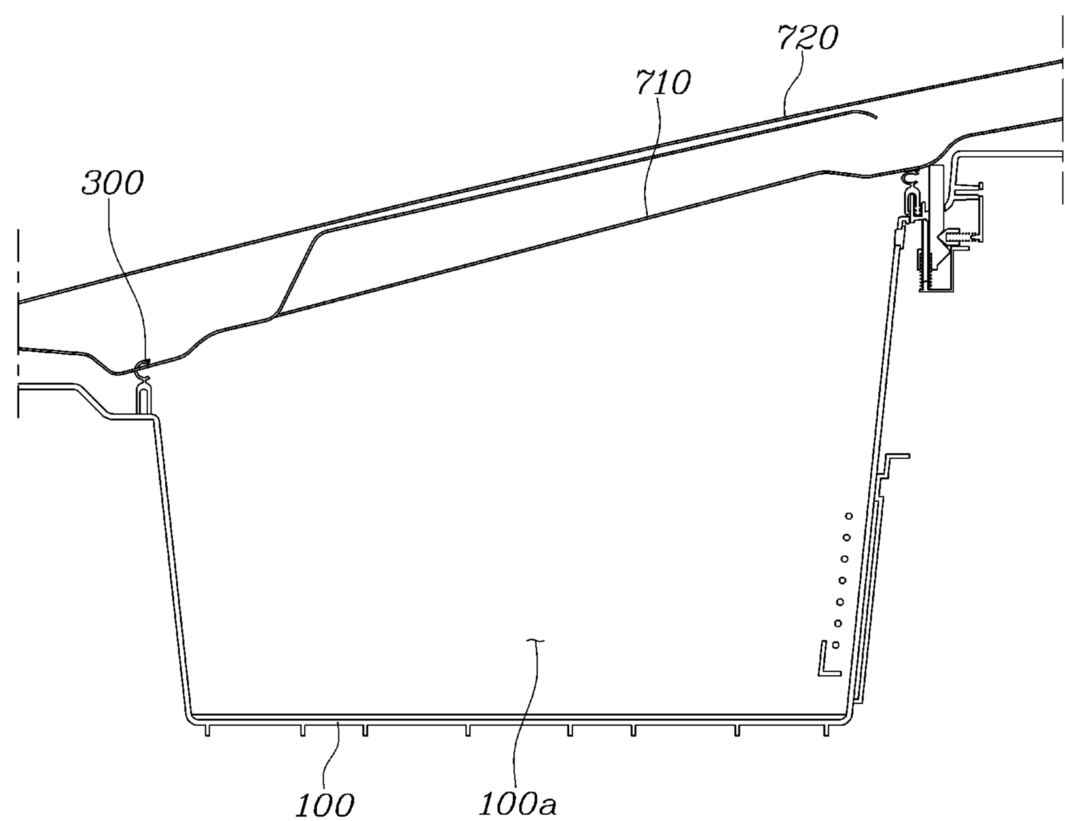
FIG. 14 is a view for explaining increase in the size of a loading space due to reduction in the size of an impact-absorbing space of the hood.

That is, in the closed state of the hood 700, when the head of the pedestrian strongly strikes the upper surface of the hood 700 and thus impact load is applied to the hood 700, as shown in FIGS. 9 and 13, the slider 500 is moved backwards, and the driven portion 510 is located in the second unlocking area 412*b*, whereby the locking protrusion 520 escapes and is unlocked from the locking through-hole 120.

In this case, the hood 700 to which impact load is applied pushes the upper part 200 downward, whereby the upper part 200 absorbs the impact load caused by the pedestrian while being separated from the lower part 100. In this way, performance of absorbing impact applied to the head of the pedestrian is improved, and consequently, the risk of injury to the pedestrian is reduced.

In addition, the locking module further includes a guider spring 420 configured to provide elastic restoring force to the guider 400 in the upward direction.

Referring to FIGS. 4 and 5, the housing 600 receives the guider 400 inserted thereinto and guides upward/downward movement of the guider 400, and the guider spring 420 is supported between the guider 400 and the housing 600.

In detail, the housing 600 includes a sliding slot 610 formed in the lower portion thereof. The sliding slot 610 is formed to have a width corresponding to the width of the guider 400 in the leftward-rightward direction. The lower end portion of the guider 400 is inserted into the sliding slot 610 so that the guider 400 is moved upward and downward along the sliding slot 610.

The guider spring 420 is implemented as a compression spring. The upper end of the guider spring 420 is supported by the lower surface of the guider 400, and the lower end of the guider spring 420 is supported by the bottom surface of the sliding slot 610.

Therefore, the guider spring 420 provides force (elastic restoring force) of pushing the guider 400 upward at all times, thereby returning the guider 400, which is moved downward by the hood 700, to the original position thereof.

In addition, the locking module further includes a slider spring 540 configured to provide elastic restoring force to the slider 500 in the forward direction.

The housing 600 receives the slider 500 inserted thereinto and guides forward/backward movement of the slider 500, and the slider spring 540 is supported between the slider 500 and the housing 600.

In detail, the housing 600 includes sling protrusions 620 protruding from the left and right inner surfaces thereof and extending in the forward-backward longitudinal direction, and the slider 500 includes sliding grooves 530 formed in the left and right outer surfaces thereof in the forward-backward longitudinal direction so as to correspond to the sliding protrusions 620. Accordingly, the slider 500 is moved forward and backward due to the coupling structure of the sliding grooves 530 and the sliding protrusions 620.

The slider spring 540 is implemented as a compression spring. The front end of the slider spring 540 is supported by the center of the rear end of the slider 500, and the rear end of the slider spring 540 is supported by the inner surface of the housing 600.

Therefore, the slider spring 540 provides force (elastic restoring force) of pushing the slider 500 forward at all times, thereby returning the slider 500, which is moved along the cam portion 410, to the original position thereof.

In some implementations, when a vehicle collides with a pedestrian and the head of the pedestrian strikes the upper surface of a hood, an upper part of the frunk is separated from a lower part of the frunk, thereby absorbing impact load caused by the pedestrian. Accordingly, performance of absorbing impact applied to the head of the pedestrian is improved, and consequently, the risk of injury to the pedestrian is reduced.

In addition, the impact load caused by the pedestrian is absorbed in a space generated by movement of the upper part of the frunk in the downward direction. Therefore, the size of a space between an outer panel and an inner panel of the hood is reduced compared to in the conventional art. Therefore, the thickness of the hood is reduced, and space obtained by reduction in the thickness of the hood is utilized as part of the loading space of the frunk. Accordingly, the size of the loading space of the frunk is increased.

In addition, when the hood is closed or fully opened, a locking protrusion is inserted into a locking through-hole. That is, a locking module enters a locking mode, whereby the lower part and the upper part are firmly coupled to each other, and introduction of foreign substances into the frunk is prevented.

In addition, when the hood is popped up, the locking protrusion escapes from the locking through-hole. That is, the locking module enters an unlocking mode, whereby the locking through-hole functions as a ventilation hole, through which difference in atmospheric pressure between the inside and outside of the frunk is eliminated. As a result, the opening/closing performance of the hood is improved.

Although the implementations of the present disclosure have been disclosed for illustrative purposes, those skilled in the art will appreciate that various modifications, additions, and substitutions are possible, without departing from the scope and spirit of the disclosure as disclosed in the accompanying claims.

What is claimed is:

1. A frunk for a vehicle, the frunk comprising:

a lower part that defines a loading space therein;

an upper part that is coupled to an upper end of the lower part and defines an opening above the loading space, the upper part being configured to be covered by a hood of the vehicle; and a locking module configured to, based on a position of the hood relative to the frunk, couple the lower part and the upper part to each other or decouple the lower part and the upper part from each other, wherein the lower part defines a locking through-hole at a side surface of the lower part, wherein the locking module comprises a latch element configured to selectively engage with the locking through-hole to couple the lower part and the upper part to each other or to disengage from the locking through-hole to decouple the lower part and the upper part based on a change of the position of the hood, and wherein the upper part is configured to, based on a load greater than or equal to a predetermined value being applied to the upper part through the hood, be pressed by the hood and separated from the lower part.

2. The frunk according to claim 1, wherein the lower part comprises a lower hook portion that is disposed at an outer surface of the lower part, the lower hook portion being curved in a downward direction, wherein the upper part comprises an upper hook portion disposed at an inner surface of the upper part, the upper hook portion being curved in an upward direction, wherein the lower hook portion is configured to catch the upper hook portion in an up-down direction, and wherein the upper hook portion is configured to be separated from the lower hook portion in the downward direction based on the upper part being pressed by the hood.

3. The frunk according to claim 1, further comprising a sealing member that is coupled to the upper part and protrudes in an upward direction, the sealing member being configured to be in contact with a lower surface of the hood.

4. The frunk according to claim 1, wherein the latch element is a locking protrusion, and wherein the locking module comprises:

a guider configured to support the hood and to move based on the change of the position of the hood;

a slider that is supported by the guider and comprises the locking protrusion having a shape corresponding to the locking through-hole, the slider being configured to move based on a change of a position of the guider to thereby couple the locking protrusion to the locking through-hole or decouple the locking protrusion from the locking through-hole; and a housing coupled to the upper part and configured to guide movement of the guider and the slider.

5. The frunk according to claim 4, wherein the guider comprises a cam portion that defines a concave-convex shape disposed in a longitudinal direction of the guider, wherein the slider comprises a driven portion configured to face the cam portion, and wherein the slider is configured to be moved forward and backward by a sliding movement of the driven portion along a surface of the cam portion.

6. The frunk according to claim 5, wherein the guider has an upper end configured to support a lower surface of the hood, wherein the slider defines a through-hole that is open in an upward-downward direction and configured to receive the guider, and wherein the driven portion is disposed at an inner surface of the through-hole that faces the lower part.

7. The frunk according to claim 5, wherein the cam portion comprises:

a locking area configured to cause the locking protrusion to move forward to thereby be locked to the locking through-hole based on the driven portion being located in the locking area; and an unlocking area configured to cause the locking protrusion to move backward to thereby be unlocked from the locking through-hole based on the driven portion being located in the unlocking area.

8. The frunk according to claim 7, wherein the locking area comprises a first locking area and a second locking area, the first locking area having a concave shape and being disposed at the surface of the cam portion along which the driven portion slides, wherein the unlocking area comprises a first unlocking area and a second unlocking area, the first unlocking area having a convex shape and being disposed at the surface of the cam portion, the first unlocking area extending downward from the first locking area, wherein the second locking area has a concave shape and is disposed at the surface of the cam portion, the second locking area extending downward from the first unlocking area, and wherein the second unlocking area is disposed at the surface of the cam portion and extends upward from the first locking area.

9. The frunk according to claim 8, wherein the driven portion is configured to:

based on the hood being closed, be located in the first locking area;

based on the hood being opened to a popped-up state, be located in the first unlocking area;

based on the hood being further opened from the popped-up state, be located in the second locking area; and based on the load being applied onto the hood, be located in the second unlocking area.

10. The frunk according to claim 1, wherein the locking module is configured to, based on the load being applied to the hood, enter an unlocking mode in which the upper part and the lower part are separated from each other.

11. The frunk according to claim 4, wherein the locking module further comprises a guider spring configured to provide elastic restoring force to the guider in an upward direction.

12. The frunk according to claim 11, wherein the housing receives the guider and is configured to guide upward-downward movement of the guider, and wherein the guider spring is supported between the guider and the housing.

13. The frunk according to claim 4, wherein the locking module further comprises a slider spring configured to provide elastic restoring force to the slider in a forward direction.

14. The frunk according to claim 13, wherein the housing receives the slider and is configured to guide forward-backward movement of the slider, and wherein the slider spring is supported between the slider and the housing.

* * * * *